Jan. 1, 1935.  A. PFISTER  1,986,644
AUTOMATIC VOLUME CONTROL
Filed Sept. 24, 1931  4 Sheets-Sheet 4
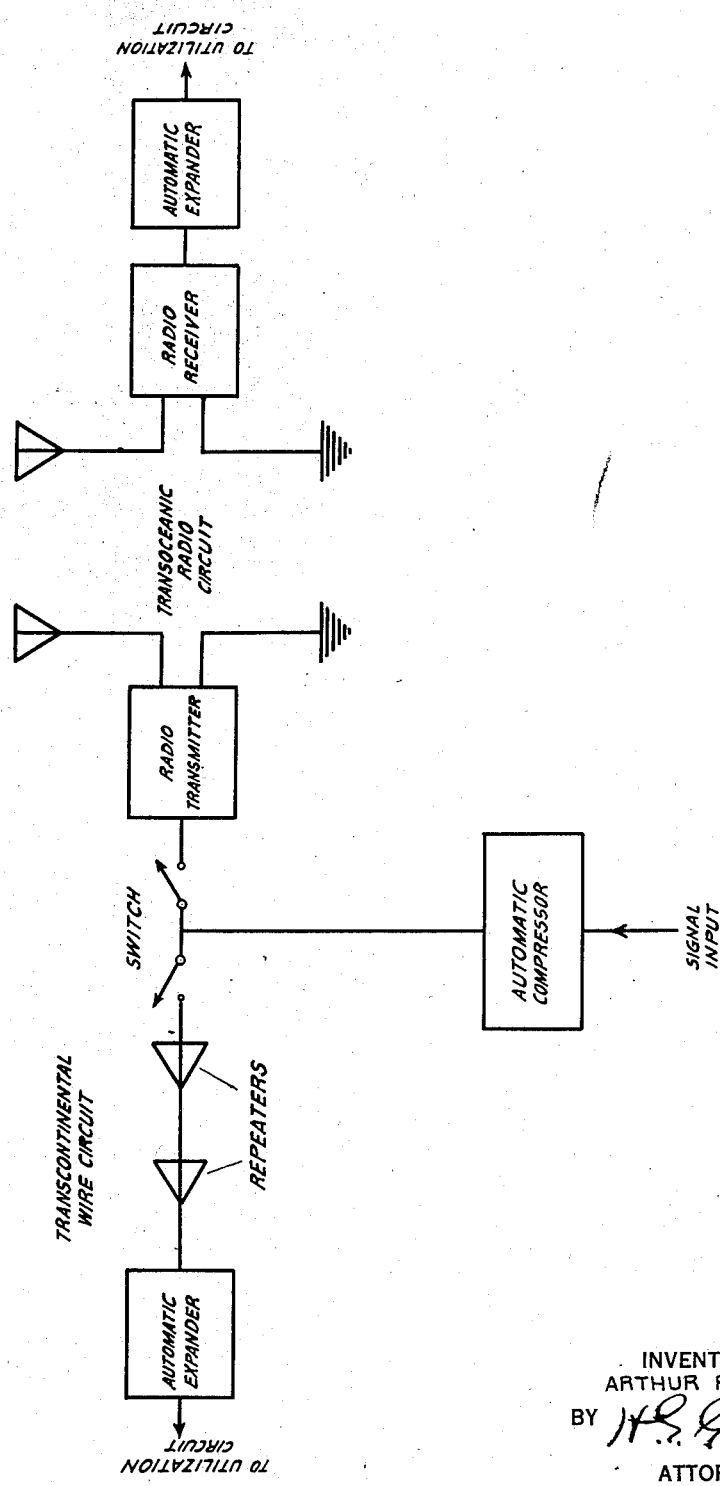
INVENTOR
ARTHUR PFISTER
BY
ATTORNEY

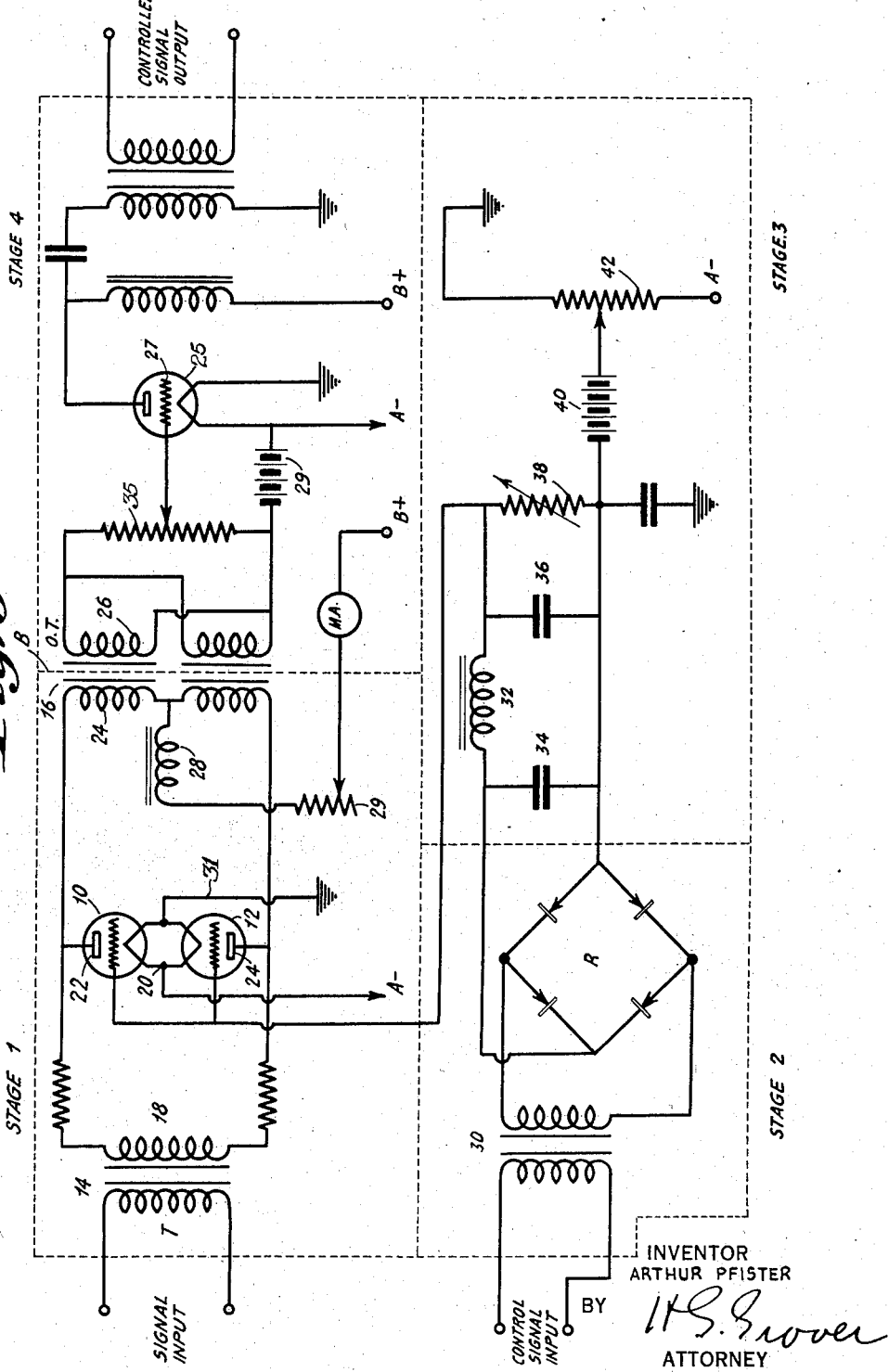

UNITED STATES PATENT OFFICE 1,986,644

AUTOMATIC VOLUME CONTROL

Arthur Pfister, Maspeth, N. Y., assignor to Radio Corporation of America, a corporation of Delaware Application September 24, 1931, Serial No. 564,752

8 Claims. (Cl. 178—44)

This invention relates to the radio art and more in particular to a novel means to be used in communication for automatically controlling the amplitude, volume, or level of signals at any frequencies, and in particular to frequencies which may be used in radio communication.

Due to the limitations imposed by existing communication lines, input equipment, and terminal equipment, it is necessary to bring all resulting level variations in the signal in their correct proportion to each other and to hold them within the permissible dynamic range of the transmission line or signal conveying medium. To do so necessitates the use of a volume control. Narrowing or compressing a dynamic range in a transmission line means insuring that the amplitude of the signals in the line is less by an amount which varies over the entire range than the signals impressed on the line. Expanding a dynamic range in a transmission line means insuring that the amplitude of the signals in the line is greater by an amount which varies over the entire range than the signals impressed on the line.

Volume controls have been known heretofore. With volume controls known heretofore it has been the practice to accomplish control of the signal amplitude by manually operated devices exclusively. Such devices known heretofore involved step-by-step attenuators and continuously variable faders, both of which are manually operated. Trained operators are required to compress signals of an initially wide dynamic range into signals of a range considerably narrower without distorting their character. Moreover, in the event that high quality musical transmission is involved, the operator must have a thorough knowledge of the particular selection he is controlling to be capable of anticipating any sudden level changes and meet them with his controls, that is, the controls connected with the step-by-step attenuators, or continuously variable faders.

The primary object of the present invention is to provide means for compressing in a new and improved manner by a new and improved means the signals within a predetermined dynamic range.

Another object of the present invention is to provide means, as indicated above, which, when slightly adjusted, will expand the transmitted signals within a predetermined dynamic range.

Another object of the present invention is to provide means, as indicated in the two preceding paragraphs, which is novel but simple in nature and entirely automatic in operation.

A further object of the present invention is to provide means cooperating with the output of said transmission line to restore the control signals resulting from the compression or expansion within a predetermined dynamic range to their original volume or to any desired volume.

Numerous other objects and advantages to be gained by the use of the present invention will appear hereinafter. No attempt has been made to list the objects of the present invention in order of their importance.

Briefly, these objects are attained by the use of a thermionic attenuator arranged in symmetrical circuits and including variable means for controlling the compressive or expansive percentage regulation. The attenuator stage is connected on the one hand with the output of the signal source and on the other hand to an amplifier which restores the amplitude to the desired amount. Control means for the attenuator is provided. This control means includes means for converting signals into unidirectional biasing voltages which are utilized to effect the impedance change in the thermionic attenuators in the symmetrical attenuator circuit. This stage may be connected with the signal input briefly described above, or with a separate signal input. Filter means are interposed between the last described control means and the attenuator. The filter means includes inertial circuits and a second means for regulating the percentage of attenuation or control imparted by the attenuator to the signal relayed therethrough.

What I consider the novel features of my invention have been pointed out with more particularity in the claims appended hereto. The nature of the invention, a preferred form thereof, and the operation thereof will be understood more fully by the following detailed description thereof and therefrom when read in connection with the drawings, throughout which like reference characters indicate like parts and in which:

Figure 3 shows diagrammatically the circuit arrangement and the units of Figure 2;

Figure 4 shows a novel broadcast distribution system including the dynamic range control device of the present invention; while.

Figure 1:
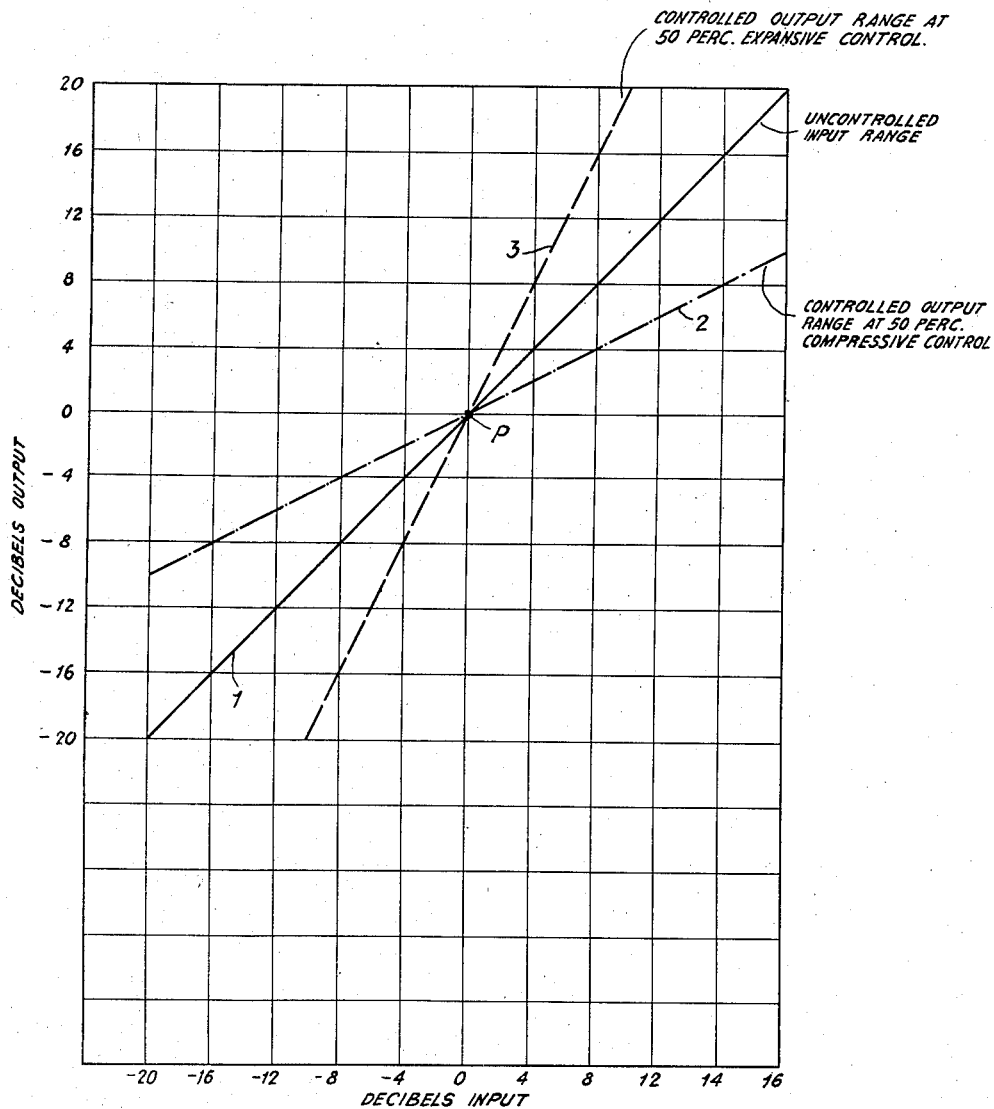
Figure 1 illustrates by curves what is meant by the terms "expansive control" and "compressive control" as applied to means for acting on the dynamic range of any signals and any frequency to be translated.

Referring to the drawings, and in particular to Figure 1 thereof, the units on the X axis of the curve represent the input to the control means in decibels, while the units along the Y axis indicate the output from the control unit in decibels. In the curves the full line 1 represents uncontrolled input range. The dotted line 2 represents controlled output range where applicant's novel control means has imparted fifty percent compressive control to the signals, while the dotted line 3 represents the controlled output of applicant's novel arrangement wherein fifty percent expansive control has been applied to the passing signals.

Figure 2:
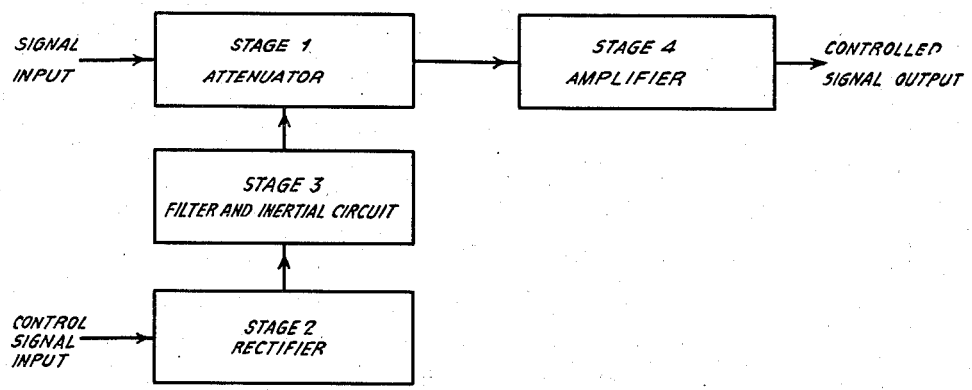
Figure 2 illustrates diagrammatically the arrangement of the various units used by applicant in accomplishing the volume control as briefly outlined hereinbefore.

In Figure 2, which illustrates diagrammatically the various stages involved, the signal to be controlled is impressed from any source on stage 1 which comprises the attenuator, and from stage 1 is impressed on stage 4 which includes the amplifier which restores the signal to the desired volume. The control signal output from stage 4 is transmitted to any utilization circuit, as, for example, a line, a modulating stage, etc.

The control signal is impressed on stage 2, which includes rectifying means for converting the signal input into unidirectional voltage. Stage 3 includes the filter and inertial circuits which are interposed between the rectifier and the balanced attenuator.

The circuit arrangement involved in the various stages in the present preferred form of the invention will now be described by reference to Figure 3 of the drawings. The attenuator proper, or stage 1, is included in a separate compartment in the metallic closure B, as indicated. This attenuator comprises a pair of thermionic tubes 10 and 12 and a line L having an input terminal at 14 and an output terminal at 16. Signals are impressed on the line L by means of a transformer T having a primary winding connected with the source and a secondary winding 18 connected across the line L. The cathode 20 of the tubes 10 and 12 is provided with a connection 31 which provides a means for balancing the transmission line with respect to ground and the metallic shielded compartment. The cathode is energized by means of a source not shown. The anode 22 of tube 10 is connected with one side of the line L, while the anode 24 of tube 12 is connected with the other side of the line L. This results in placing the anode cathode impedance of the two tubes in series across the line. Signal oscillations which are not shunted by the anode cathode impedance of the tubes 10 and 12 appear in the primary winding 24 of an output transformer OT and are repeated in the secondary winding 26 thereof. The secondary winding 26 is arranged, as shown, to impress the signal voltages accumulatively on the potentiometer 35 to be utilized or further acted on in a manner which will appear more in detail hereinafter. The primary winding 24 in the output end of the line comprises two symmetrical portions, as shown. The center tap, or the midpoint of these two sections, is connected through a choking inductance 28 and a variable resistance 29 to the high potential terminal of the anode power source. Indicating means, as, for instance, a milliammeter, may be inserted in this connection.

Attenuation is effected by the shunt arm, that is, by the internal impedance of the tubes 10 and 12 connected in the full wave circuit across the line. Grid bias variation of these tubes obviously regulates the attenuation since variation of grid bias varies the internal impedance of the tubes. The attenuation may be varied within a range determined by the obtainable internal impedance variation of the valves. The resistance 29 permits variation of the relation of grid bias to internal resistance of the tubes. This variable resistance 29 represents the first of two means for obtaining regulation of, percentage of, control of the dynamic range within which the signal is held.

Stage 2 includes the means for controlling the biasing potential applied to the tubes of the thermionic tubes in stage 1. This means includes a transformer 30 having a primary circuit separately connected to the signal source and a secondary circuit connected across the diagonals of a full wave rectifier R. The other diagonals of the full wave rectifier R are connected, as shown, to the filter circuit included in stage 3. The unidirectional current derived from the signal input appears at the input terminals of the filter stage wherein the current is filtered to obtain pulses more free of alternating current components. The filter circuit in stage 3 includes a series inductance 32 and parallel condensers 34 and 36. The values of the inductance 32 and the capacities 34, 36 are such as to introduce the desired inertial, or lag, in the filter circuit. The filter circuit terminates in a variable resistance 38. A normal biasing potential is applied from a biasing source 40 connected with the negative terminal of the filter circuit on the one hand and through a variable potentiometer 42 to the negative terminal of the A source on the other hand. The rectifier R in stage 2 provides unilateral voltages, the amplitude of which is characteristic of the amplitude of the input signal. Thus, direct current pulsations are filtered in the filter circuit in stage 3 and applied to the grid of the attenuator tubes in stage 1 to obtain at the output of the attenuator a dynamic level of prescribed value corresponding to the input level. The resistance 38 provides the second of the two means for obtaining regulation of percentage of control. The inertial and filter circuit of stage 3 converts any rate of amplitude changes occurring in stage 2 into a resultant average amplitude whose rate of change may be below audibility and whose periodicity is being determined by an adjustable time constant which utilizes the duration of charge and discharge of a condenser through a resistance.

The amplifier in stage 4 is of conventional design and comprises thermionic tube 25 having a control electrode 27 connected to a point on the potentiometer 35. Biasing potential is applied by a source 29. The amplifier 25 restores the signal derived from the attenuator to the desired average level. The anode circuit of the amplifier stage 25 may be connected with a transformer, as indicated, or with a load circuit directly.

In operation, with equal levels applied to the signal input of stage 1 and the control signal input of stage 2 of the automatic volume control of a value indicated by the point P on the curves of Figure 1, it is evident that at this point P no controlling of the signal takes place since the gain of stage 4 just compensates for the loss suffered in stage 1. All signal levels above or below the point P are being amplified or attenuated respectively by an amount which depends entirely upon the percentage of control which in turn is the function of the attenuator tube characteristics and their plate current, grid voltage relations.

In the case of signal level compression at lower input levels, the attenuation decreases and aids the amplification and conversely at higher signal input levels the attenuation increases, thereby opposing the amplification. Hence, the output variations assume a control characteristic which may well be represented by curve 2 of Figure 1. For signal level expansion the above action is reversed. This will be obvious by an inspection of curve 3 of Figure 1.

Point P may be chosen to lie anywhere along the control characteristic curve within certain limits by initially adjusting by means of the filter circuit and resistance 38 the bias applied to the grids of the attenuator tubes and by adjusting the resistance 29 in the output circuit of the attenuators and by adjusting the gain control resistance 28 of the amplifier stage.

While it will be readily understood that my novel dynamic range determining device or volume control may be used in any signalling circuit used today, and at any point in said circuits either as a dynamic range expander or as a dynamic range compressor, I have, for purposes of illustration, shown in Figure 4 a preferred broadcasting arrangement wherein the dynamic range control has been utilized. It will again be repeated that this illustration and the illustrations following are made merely by way of illustration and not to limit the application of said volume control except as outlined in the claims hereinafter.

In Figure 4 is illustrated a broadcasting system wherein the signals from any source, designated here signal input, are passed through a dynamic range control device acting as an automatic compressor, as indicated. The signals pass from the last named device to a line and through a switching arrangement to be utilized in either of two manners. When the switch to the left is closed the compressed signals are passed through a transcontinental wire circuit including the necessary repeaters to an automatic expander which in turn applies the signals to any utilization circuit. The automatic compressor comprises the signals within a dynamic range easily handled by the transcontinental wire circuit. When the right hand switch is closed the compressed signals are fed to a radio transmitter where they are amplified if necessary and impressed on high frequency carrier waves for transmission. The radiated waves are received on any absorption structure from which they are fed to a radio receiver as indicated. From the radio receivers the signals may be passed through an automatic expander and restored to their original amplitude and fed to any utilization circuit.

The system outlined briefly above is especially applicable to short wave transcontinental broadcasting.

Figure 5:
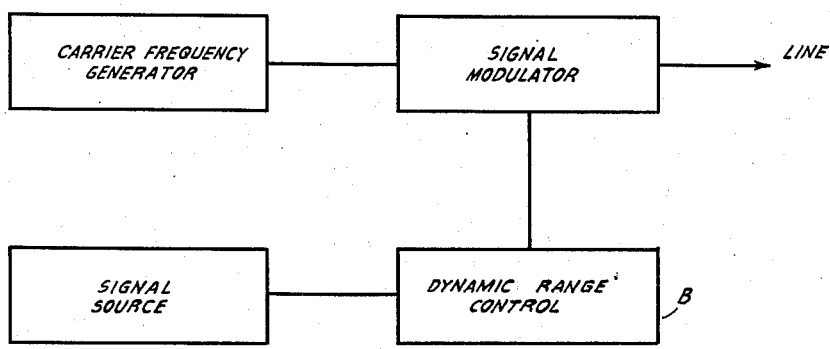
Figure 5 shows an application of the dynamic range control device to a generator and signal modulator system.

In Figure 5 is shown the dynamic range control interposed between a source of signals and a signal modulator which is connected on the one hand to a line feeding a utilization circuit, and on the other hand to a carrier frequency generator. The signals from the signal modulator may be passed over the line to a second dynamic range control or to amplifiers, or to any known utilization circuit.

Having thus described my invention and the operation thereof, what I claim is:

1. In signalling devices, a signal transmission line to be connected with an audible frequency source and means to attenuate the signals passing over said line comprising, a pair of thermionic tubes having their impedances connected in series across said line, means for balancing said line and said attenuating means comprising, a connection between the impedances of said tubes and ground, and means responsive to signal variations for varying the impedances of said tubes comprising, a rectifier connected on the one hand to the control electrodes of said tubes and on the other hand to the said source of signals connected with said line.

2. Signalling means comprising, a transmission line having its input terminals connected with a source of signals, a pair of transformers having their primary windings connected in series across the terminals of said line, a thermionic amplifier, means for connecting the secondary windings of said transformers in parallel and with the input electrodes of said thermionic amplifier, a work circuit connected with the output electrodes of said amplifier, means for attenuating the signals passed over said line comprising, a pair of thermionic tubes having their internal impedances connected in series across said line, means for balancing said line and said attenuating means comprising, a connection between said thermionic impedances and ground, and means for determining the impedance offered by said tubes to signals flowing in said line comprising, a rectifier, a filter circuit connected between the output electrodes of said rectifier and the control electrodes of said attenuator tubes, and means connecting the input circuit of said rectifier to said source of signals.

3. An arrangement as claimed in claim 2 in which, said transmission line includes a resistance on each side thereof, said rectifier is of the full wave type, and in which said filter circuit includes a variable resistance.

4. In a broadcasting system comprising, high frequency carrier wave relaying means, a source of modulating potentials, and a transmission line between said modulating potential source and said relaying means, an automatic volume control device for attaining a higher average percentage of modulation with a resulting increase in signal strength at the receiver comprising, a pair of thermionic tubes each having an anode, cathode and control grid, each tube having its anode to cathode impedances connected in series across said transmission line, a connection between said impedances and ground whereby said transmission line is balanced, a rectifier having input terminals supplied with modulating potentials from said source, and a filter circuit connected between the output terminals of said rectifier and the control electrodes of said tubes.

5. In a broadcasting system including, high frequency carrier wave relaying means, a source of modulating potentials, a transmission line between said modulating potential source and said relaying means, receiving means, signal utilizing means and a transmission line between said receiving means and said utilizing means, an automatic volume control device in one of said transmission lines for maintaining in said system a dynamic range of signals to meet certain demands which call for a proportionality of the controlled signal at a certain ratio to the uncontrolled signal comprising, a pair of thermionic triodes, each having its anode connected to a different side of said transmission line and its cathode connected to ground whereby said line is balanced, a rectifier having input terminals supplied with modulating potentials from said source, a filter circuit connected with the output terminals of said rectifier, and a connection between said filter circuit and the control electrodes in said triodes.

6. In a broadcasting system including, high frequency carrier wave relaying means, a source of modulating potentials, a transmission line between said modulating potential source and said relaying means, receiving means, signal utilizing means and a transmission line between said receiving means and said utilizing means, an automatic range determining means in each of said transmission lines for maintaining the signals which flow therein in a certain dynamic range to meet certain demands which call for a proportionality of the controlled signal at a certain ratio to the uncontrolled signal comprising, a pair of thermionic triodes for each line, each triode of a pair having its anode connected to one side of said transmission line and their cathodes connected together and to ground whereby said lines are balanced, a pair of rectifiers having input terminals supplied with modulating potentials from said source, a filter circuit connected with the output terminals of each of said rectifiers, said filter circuits terminating in variable resistances, and a connection between each of said resistances and the control electrodes in a different pair of said triodes.

7. In a broadcasting system including, high frequency carrier wave relaying means, a source of modulating potentials, a transmission line between said modulating potential source and said relaying means, receiving means, signal utilizing means and a transmission line between said receiving means and said utilizing means, an automatic volume control device in one of said transmission lines for attaining a higher average percentage of modulation with a resulting increase in signal strength at the receiver comprising, a pair of thermionic tubes having their cathodes connected together and their grids connected together, means for connecting the anode of each of said tubes to opposite sides of said transmission line, a rectifier having input terminals supplied with modulating potentials from said source, a filter circuit comprising series inductances and parallel capacities connected with the output terminals of said rectifier, said filter circuit terminating in a variable resistance, and a connection between said resistance and the control electrodes in said tubes.

8. A translating circuit for conveying audible frequencies from a source of audible frequency signals to a utilization circuit comprising, a transmission line coupled on the one hand to said source of audible frequencies and on the other hand to said circuit, an automatic range determining means in said transmission line for maintaining the signals of audible frequency which flow therein within a certain dynamic range to meet certain demands of said line which call for a proportionality of the signal at a certain ratio to the uncontrolled signal comprising a pair of thermionic tubes having anode, cathode and control electrodes, circuits for connecting the anode to cathode impedance of said tubes in series across said line, means for balancing said line with respect to ground comprising a connection between the cathodes of said tubes and ground, a rectifier having its input terminals connected with said source of audible frequency signals, a filter circuit connected with the output terminals of said rectifier, and a connection between said filter circuit and the control electrodes in each of said tubes.

ARTHUR PFISTER.